United States Patent [19]

Oishi

[11] Patent Number: 4,898,338

[45] Date of Patent: Feb. 6, 1990

[54] MAGNETIC TAPE CASSETTE

[75] Inventor: Kengo Oishi, Kanagawa, Japan

[73] Assignee: Fuji Photo Film Co., Ltd., Kanagawa, Japan

[21] Appl. No.: 247,233

[22] Filed: Sep. 21, 1988

[30] Foreign Application Priority Data

Sep. 21, 1987 [JP] Japan .............................. 62-143016[U]
Sep. 21, 1987 [JP] Japan .............................. 62-143017[U]

[51] Int. Cl.$^4$ ............................................. G11B 23/04
[52] U.S. Cl. ..................................................... 242/198
[58] Field of Search ........................ 242/197, 199, 198; 360/132, 96.1, 96.5

[56] References Cited

U.S. PATENT DOCUMENTS 4,607,308  8/1986  Tsuruta et al. ...................... 360/132
4,786,996  11/1988  Ohtani et al. .................... 360/132 X Primary Examiner—David Werner

[57] ABSTRACT

A magnetic tape cassette having an improved mistaken-insertion preventing structure. The cassette includes a pair of tape reels on which a magnetic tape is wound, a case in which the tape reels are rotatably mounted with an opening being formed in a front of the cassette through which the tape can be pulled out for recording and playback, and a guard panel provided at a front of the cassette for opening and closing the opening. In one embodiment, a bottom of the case is provided with at least three guide grooves extending in a front-to-rear direction of the cassette at a central portion thereof and both ends of the cassette corresponding in position to insertion guides of a recording/playback apparatus and located away from areas of rotation of the reels in directions of length, width and thickness of the cassette. Corresponding notches may also be provided in the guard panel, which may have a double-panel construction.

9 Claims, 2 Drawing Sheets

MAGNETIC TAPE CASSETTE

BACKGROUND OF THE INVENTION

The present invention relates to a magnetic tape cassette, and particularly to a magnetic tape cassette of a type in which a magnetic tape is pulled out from the front of the cassette for recording and playback.

High-density recording has been recently been made possible using magnetic tape cassettes. Typical of such magnetic tape cassettes are VHS- and Beta-type cassettes for home use and M-type cassettes for commercial use. Although magnetic tape cassettes of such types employ different recording formats and have slight differences in their construction, in each case a magnetic tape is pulled out from a front opening in the cassette for recording and playback. The magnetic tape cassette is provided with a turnable guard panel which closes the front opening when the cassette is not in use and exposes the opening for recording the playback of the cassette.

When the magnetic tape cassette is loaded in a video cassette recorder, the cassette is first horizontally inserted into the machine and then moved in the direction (downward in general) of thickness of the cassette so that the guard panel is moved to open the front opening. Then, a tape pull-out member is moved to the back (nonmagnetic side) of the magnetic tape to appropriately pull the tape out of the cassette through the opening.

In order to avoid mistaking one magnetic tape cassette type for another, different configuration of guide grooves are provided on the cases of the cassettes to prevent insertion of the wrong type of cassette into a particular recording/playback apparatus, which has an insertion guide which will receive only one type of cassette. The length and depth of the guide grooves must be set at prescribed values to ensure proper interaction of the guide grooves and the insertion guide. That is, the positions of the guide groove and the insertion guide at the central area of the bottom of each magnetic tape cassette are made slightly different for each type of cassette. However, since the positions of the guide groove and the insertion guide are only made slightly different among conventional cassettes and recording/playback apparatuses, the guide groove of a cassette smaller in size than the proper cassette for a particular recording/playback apparatus can sometimes be mistakenly inserted into the machine, causing jamming or possibly damage to the machine.

Much research and development has recently been conducted in order to enable recording and playback of even higher quality than before, and new magnetic tape cassettes have been proposed which are capable of recording and playback of higher densities than before. If such new magnetic tape cassettes are similar in form to conventional cassettes, the above-mentioned problems are likely to become more prominent.

Moreover, even the proper magnetic tape cassette for a particular machine can sometimes be inserted upside down. In order to prevent such mistaken insertion, the guard panel of the conventional cassette is provided with a notch at the top of the guard panel corresponding to the position of the guide of the cassette holder during upside down insertion. For example, when a conventional magnetic tape cassette as shown in FIG. 1 is inserted upside down into the cassette holder of a recording/playback apparatus, the cassette comes into contact with the insertion guide of the cassette holder at a notch 10a provided in the guard panel 5a of the cassette at the top of the central part of the panel to thus prevent mistaken insertion. However, if the guard panel 5a comes into strong contact with the insertion guide, the guard panel can be strongly flexed, causing it to be deformed plastically or damaged. In an extreme case, the guard panel 5a can pass over the insertion guide at the notch 10a so that the magnetic tape cassette is completely mistakenly inserted into the recording/playback apparatus.

Moreover, although the opening of most conventional magnetic tape cassettes is closed at the front (facing the magnetic film side of the magnetic tape in the cassette) and top of the cassette by the guard panel, a front opening provided in the bottom of the cassette to allow inserting of the tape pull-out member into the front opening remains open so that dust or the like is likely to enter the cassette through the front opening. Also, finger contact or the like with the magnetic tape can occur when the cassette is handled. This can result in increasing the occurrence of dropout caused by dust or the like and can result in deformation of the magnetic tape, causing a deterioration of the recording/playback properties thereof. Therefore, it is difficult to maintain the performance of a magnetic tape cassette for long periods of time.

In order to solve such problems, a guard panel having improved dustproofing characteristics and providing better protection in general has been desired. For example, it is desirable to employ a guard panel composed of inner and outer guard panels between which the magnetic tape is supported. Doing so, however, greatly complicates the structure of the magnetic tape cassette and makes it more likely that deformation or the like of the guard panel will occur upon mistaken insertion of the cassette.

SUMMARY OF THE INVENTION

The present invention was made in consideration of the above-mentioned problems and drawbacks.

Accordingly, it is an object of the present invention to provide a magnetic tape cassette including means for preventing problems from being caused due to mistaking a magnetic tape cassette of similar but different type for the proper cassette but which does not otherwise limit the construction of the cassette.

In accordance with the above and other objects, there is provided a magnetic tape cassette having a pair of tape reels on which a magnetic tape is wound housed in the magnetic tape cassette. An opening from which the magnetic tape is pulled out of the cassette for recording or playback, and a guard panel for opening or closing the opening are provided at the front of the cassette. The cassette is characterized in that the bottom of the cassette is provided with at least three guide grooves which extend in the front-to-rear direction of the cassette at the central portion and both ends of the cassette, corresponding to respective insertion guides of a recording/playback apparatus, the guide grooves being located away from the areas of rotation of the tape reels in the directions of length, width and thickness of the magnetic tape cassette. Since the guide grooves are provided at the central portion and both ends of the magnetic tape cassette, the distance between the guide grooves differs from that between the guide grooves of similar cassettes but of different length so that the cassette can be easily distinguished from others. Thus, other types of magnetic tape cassettes can be prevented from being inserted into the recording/playback apparatus.

That is, guide grooves, which are of simple construction, prevent mistaking the various types of magnetic tape cassettes from one another. Since the guide grooves are located away from the areas of rotation of the tape reels in the directions of length, width and thickness of the magnetic tape cassette, the depth of the guide grooves can be made large to allow an increase in the size of the insertion guides of the recording/playback apparatus to more surely prevent mistaken insertion of the wrong type of cassette.

Further, the present invention provides a magnetic tape cassette having a mistaken insertion preventive function for preventing the cassette from being inserted upside down into a recording/playback apparatus, characterized in that the bottom of a guard panel is provided with notches for preventing the mistaken insertion of the cassette, the notches being located so that when the cassette is inserted upside down into a recording/playback apparatus, the notches nearly correspond in position to the guides of the cassette holder of the machine, which correspond to the cassette insertion guide grooves in the bottom of the cassette when the cassette is properly inserted into the machine. Since the notches which contact the insertion guides to prevent the cassette from being inserted upside down are provided in the guard panel not only at the central portion of the panel but also at both the ends thereof near end members, the strength of the guard panel at the notches is increased and flexing of the guard panel is inhibited due to contact with the insertion guides of the cassette holder of the recording/playback apparatus. For that reason, even if an inner guard panel is provided in addition to the above-mentioned guard panel to form a dual-type guard panel assembly to improve the dust prevention and tape protecting properties of the cassette, the reliability of the magnetic tape cassette is still high enough to prevent the above-discussed problems due to mistaken insertion of the cassette.

DESCRIPTION OF THE PREFERRED EMBODIMENTS

Preferred embodiments of the present invention are hereafter described in detail with reference to the drawings.

Figure 2:
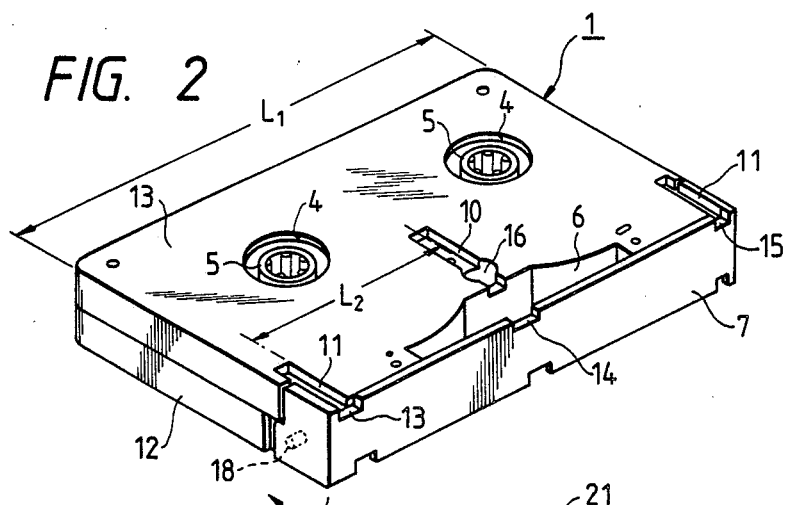
FIG. 2 is a perspective bottom view of magnetic tape cassette constructed in accordance with the present invention.

FIG. 2 shows a perspective bottom view of a magnetic tape cassette 1 constructed according to a preferred embodiment of the invention. The body or case of the magnetic tape cassette 1 is composed of upper and lower half portions 40 and 41. A pair of tape reels 5 on which a magnetic tape is wound are housed in the body of the cassette 1 at positions corresponding to hub shaft holes 4 and are rotatable.

The cassette 1 is nearly the same in constitution as a conventional video tape cassette of the VHS type, but differs in the constitution of the bottom of the cassette. The difference is that the bottom of the magnetic tape cassette 1 is provided with at least three guide grooves 10, 11 and 12 extending in the front-to-rear direction of the cassette. The guide groove 10, which is of large width, is provided substantially at the center of the length of the cassette and joins a photosensor insertion hole 16 in the same manner as the conventional video tape cassette. The other guide grooves 11 and 12 of small width are provided at both ends of the cassette 1 and are located at the corners thereof.

The guard panel 7 of the magnetic tape cassette 1 has a notch 14 in the central part of the bottom of the guard panel located so that the position of the notch corresponds to that of the guide groove 10 in the direction of insertion of the cassette 1 into a recording/playback apparatus. The notch communicates with the guide groove. The guard panel 7 is also provided with notches 13 and 15 at the right and left ends of the panel communicating with the guide grooves 11 and 12, respectively.

The guide grooves 10, 11 and 12 are located so as not to adversely affect the other portions of the magnetic tape cassette 1. Specifically, the central guide groove 10 is located away from the areas of rotation of the lower flanges of the right and left tape reels 5 in the directions of length, width and thickness of the magnetic tape cassette 1. The right and left guide grooves 12 and 11 are also located away from the areas of rotation of the lower flanges of the right and left tape reels 5 in the directions of length, width, and thickness of the cassette 1. As a result, the depth of each of the guide grooves 10, 11 and 12 can be made large enough for them to perform their function satisfactorily.

The cassette holder of the recording/playback apparatus (not shown in the drawings) is provided with guide projections in positions corresponding to those of the guide grooves 10, 11 and 12, and is also provided with an opening member in a position corresponding to that of one of the right and the left guide grooves 12 and 11. The opening member functions to open the guard panel 7.

When the magnetic tape cassette 1 is inserted with the proper orientation into the cassette holder of the recording/playback apparatus, the positions of the guide grooves 10, 11 and 12 of the cassette coincide with those of the guide projections of the cassette holder so that the guide projections are received in the guide grooves to allow the cassette to be fully inserted into the holder. The cassette holder is subsequently moved downward so that the guard panel 7 is opened, a tape pull-out member is moved into the front opening 6 of the magnetic tape cassette 1, and the tape reels 5 are engaged with rotary shafts. The cassette 1 is thus loaded in the recording/playback apparatus properly.

When a magnetic tape cassette of different type from the magnetic tape cassette 1, namely, one which is equal to or smaller in size than the latter and has only one guide groove which is nearly the same as the guide groove 10 of the cassette 1 and is located in the central portion of the bottom of the cassette, is mistaken for the cassette 1 and inserted a short distance into the recording/playback apparatus, the guide projections of the cassette holder of the machine prevent the cassette from being inserted further. If the ejection mechanism of the recording/playback apparatus is preset to operate upon slight insertion of a mistaken cassette into the machine, the discharge of the cassette by the ejection mechanism prevents the mistaken insertion from damaging the cassette and damaging the machine. This mistaken insertion preventive effect is produced not only by providing at least three guide grooves 10, 11 and 12 but also by locating them at the central portion and right and left ends of the bottom of the magnetic tape cassette 1 so as to distinguish the cassette from other magnetic tape cassettes. The distance $L_2$ between the central guide groove 10 and each of the other guide grooves 11 and 12 is nearly equal to half the length $L_1$ of the cassette 1. If the length of a similar magnetic tape cassette differs from that $L_1$ of the magnetic tape cassette 1, the distance between the guide grooves of the similar cassette also differs from that between the guide grooves of the cassette 1. Therefore, even though the guide grooves of the similar magnetic tape cassette are similar to those of the magnetic tape cassette 1, it is very easy to distinguish the former cassette from the latter cassette if only the length of the former cassette is different from that of the latter cassette.

Although three guide grooves are provided in the above-described embodiment, the present invention is not limited to this number and may be otherwise embodied so that another number of guide grooves is provided.

Figure 3:
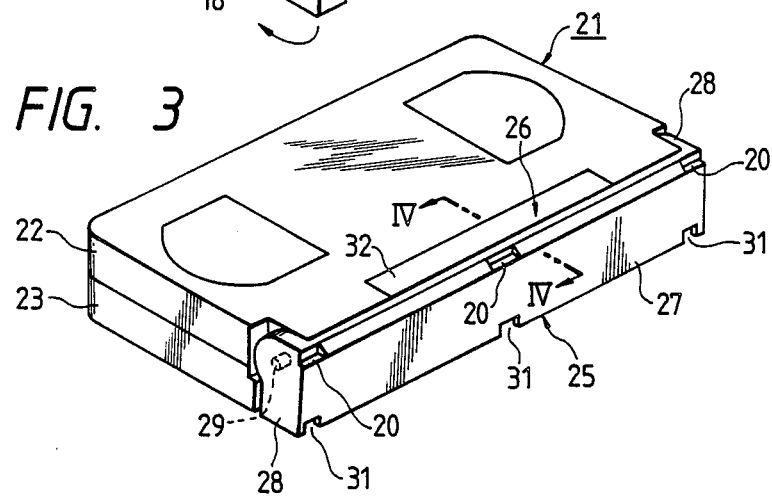
FIG. 3 is a perspective view of a magnetic tape cassette constructed in accordance with another embodiment of the present invention.
Figure 4:
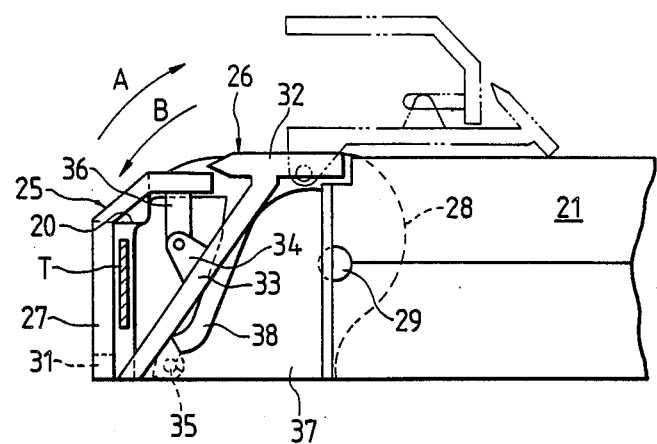
FIG. 4 is a sectional view of the magnetic tape cassette of FIG. 3 taken along a line IV—IV.

FIG. 3 shows a perspective view of a magnetic tape cassette 21 constructed according to another embodiment of the invention. FIG. 4 shows a sectional view of the magnetic tape cassette 21 taken along a line IV—IV in FIG. 3. The body of the cassette 21 is composed of upper and lower half portions 22 and 23. A pair of tape reels on which a magnetic tape T is wound are rotatably supported in the body of the cassette 21, and the tape is pulled out from the front opening of the cassette for recording and playback. An outer guard panel 25 and an inner guard panel 26 are provided at the front opening of the cassette 21 and are appropriately engaged with each other as described hereinafter in such a manner that the panels can be opened upward together, as shown by double dot chain lines in FIG. 4.

The outer guard panel 25 is rotatably supported by rotary shafts 29 provided on both end members 28 in the same manner as a conventional video tape cassette. The front portion 27 of the outer guard panel 25 faces the magnetic side (obverse side) of the magnetic tape T. The top of the front portion 27 is provided with mistaken insertion preventive notches 20 at the central part and both ends of the magnetic tape cassette 21. The bottom of the front portion 27 is provided with notches 31 corresponding to the mistaken insertion preventive notches 20.

The cross section of the inner guard panel 26 has substantially a "T" shape. The panel 26 is composed of an upper portion 32 for covering the top of the magnetic tape cassette 21 and a lower portion 33 facing the nonmagnetic side (reverse side) of the magnetic tape T. The length of the inner guard panel 26 is nearly equal to that of a front opening 30, into which a member for pulling out the magnetic tape T from the front of the magnetic tape cassette 21 is inserted. The middle part of the lower portion 33, in the vertical direction is provided with an engaging lug 34 pivotally coupled to a lug 36 provided on the inside surface of the outer guard panel 25. The bottom of the lower portion 33 is provided with sliding protrusions 35 located at both ends of the lower portion and slidably fitted in sliding grooves 38 provided in inner walls 37 at the front opening 30.

Figure 5:
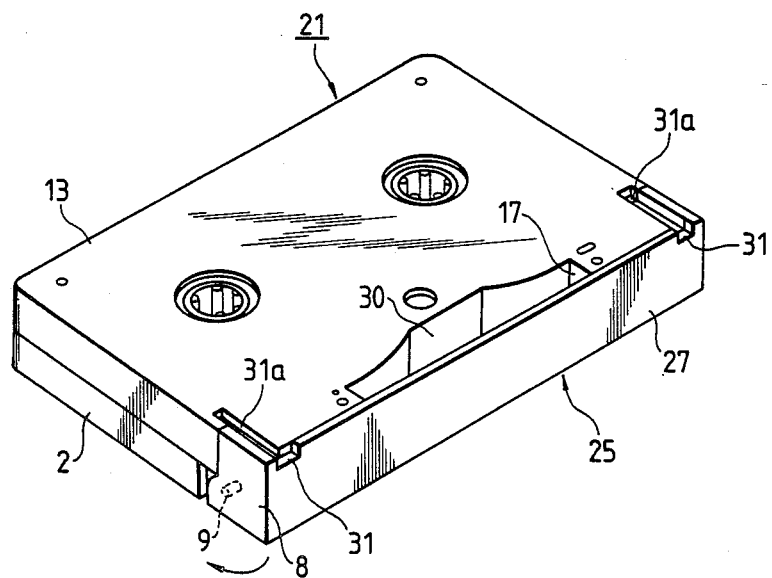
FIG. 5 is a perspective bottom view of the magnetic tape cassette shown in FIG. 3.

When the magnetic tape cassette 21 is inserted in the proper direction into the cassette holder of a recording/playback apparatus such as a video cassette recorder, guides provided at the bottom of the cassette holder and which are three in number, for example, coincide with the notches 31 of the outer guard panel 25 and guide grooves 31a in the bottom of the magnetic tape cassette 21 extending in the direction of the width thereof and communicating with the notches as shown in FIG. 5 so that the cassette is allowed to be inserted further. The cassette holder is subsequently moved down so that the outer guard panel 25 of the cassette 21 is engaged with the opening member of the recording/playback apparatus and opened about the rotary shafts 29 in a direction A shown in FIG. 4. At that time, the inner guard panel 26 is opened in conjunction with the outer guard panel 25 while the sliding protrusions 35 of the inner guard panel are guided by the sliding grooves 38. As a result, the front opening of the cassette 21 is opened and the magnetic tape T is pulled out from the front of the cassette for recording or playback.

Figure 1:
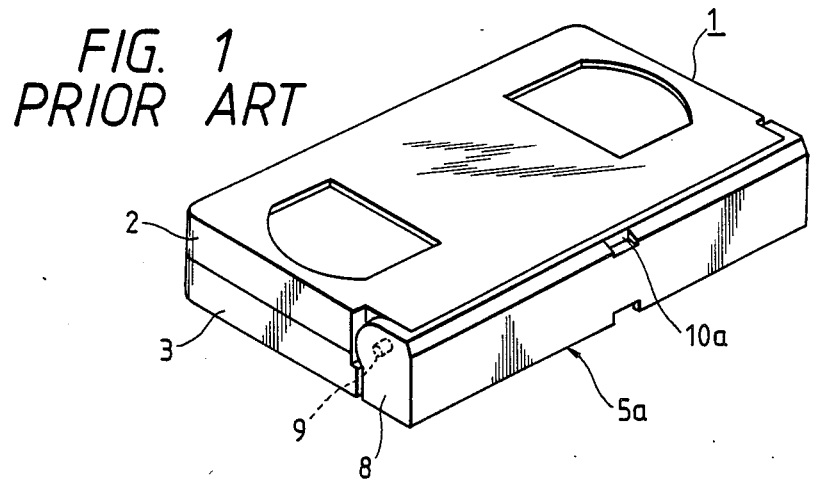
FIG. 1 is a perspective bottom view of a conventional magnetic tape cassette.

If the cassette 21 is inserted upside down into the cassette holder of the recording/playback apparatus, the top of the cassette contacts the guide protrusions of the cassette holder, preventing the cassette from being inserted into the holder further. Also, at the notches 20 in the top of the outer guard panel 25, the top of the cassette 21 comes into contact with the guide protrusions of the cassette holder. Since the notches 20 are provided in the outer guard panel 25 at the central portion thereof and near the end members 28 extending in the front-to-rear direction of the cassette 21, the thickness of each of the notches in that direction can be made sufficiently large. Since the notches 20 at the end members 28 are located near the rotary shafts 29 supporting the outer guard panel 25, the depth of each of the notches can be made large and the strength of the outer guard panel increased at the notches. Moreover, the front portion 27 of the outer guard panel 25 is made stiffer than the above-mentioned guard panel 5a provided with a notch 10a only at the central portion of the panel as shown in FIG. 1. For that reason, the accuracy of the position of the outer guard panel 25 is enhanced to more surely prevent mistaken insertion and prevent the outer guard panel and the inner guard panel 26 from being much deformed or disengaged from each other. Furthermore, since the outer guard panel 25 and the inner guard panel 26 are provided sufficiently far away from the front opening 30 containing a part of the magnetic tape T, problems such as damage to the tape due to deformation of the guard panels or the like are avoided. Since the guide protrusions of the cassette holder of the recording/playback apparatus and the top of the magnetic tape cassette 21 come into contact at the notches 20 provided at the central portion and both ends of the outer guard panel 25 upon mistaken insertion, the cassette receives a load more uniformly than the conventional cassette including the guard panel 5a provided with the notch 10a only at the central portion of the panel, and therefore less deformation is caused. For that reason, the safety of the inventive cassette 21 is higher than a conventional cassette.

Although the inner guard panel 26 is provided in the above-described embodiment, the present invention is not limited to such an arrangement, and the invention may be otherwise embodied so that a cassette is provided with only one guard panel having mistaken insertion preventive notches not only at the central portion of the panel but also at the ends thereof to surely prevent deformation of the guard panel upon mistaken insertion of the cassette.

What is claimed is:

1. A magnetic tape cassette comprising:
a pair of tape reels on which a tape is wound;
a case in which said tape reels are rotatably mounted;
an opening disposed in front of said cassette through which said tape can be pulled out for recording and playback;
a guard panel provided at a front of said cassette for opening and closing said opening; and
at least three guide grooves provided on a bottom of said case and extending in a front-to-rear direction of said cassette at a central portion and both ends of said cassette;
wherein said guide grooves are positioned to engage insertion guides of a recording/playback apparatus and are located away from areas of rotation of said reels in directions of length, width and thickness of said cassette; and
wherein one of said guide grooves disposed at said central portion of said cassette is wider than said guide grooves disposed at said ends of said cassette, and joins a photosensor insertion hole.

2. A magnetic tape cassette of claim 1, wherein said guide grooves disposed at said ends of said cassette are located at corners of said cassette.

3. A magnetic tape cassette of claim 2, wherein said guard panel is provided with notches located in positions corresponding to said guide grooves.

4. A magnetic tape cassette comprising:
a pair of tape reels on which a magnetic tape is wound;
a case in which said tape reels are rotatably mounted;
an opening disposed in a front of said cassette through which said tape can be pulled out for recording and playback;
a guard panel rotatably mounted to open and close said opening;
a plurality of insertion guide grooves being formed in a bottom of said case at positions corresponding to guides of a cassette holder of a recording/playback apparatus; and
notches for preventing mistaken insertion of said cassette into said recording/playback apparatus, said notches being provided in a top of said panel at the ends thereof and located so that, when said cassette is inserted upside down into said recording/playback apparatus, said notches substantially correspond in position to said guides of said cassette holder of said recording/playback apparatus.

5. A magnetic tape cassette of claim 4, wherein said guard panel comprises inner and outer panels so that said tape passes between said inner and outer panels, said notches being provided in said outer panel.

6. A magnetic tape cassette of claim 5, further comprising a second set of notches provided in a bottom of said outer panel at positions corresponding to said guides of said cassette holder.

7. A magnetic tape cassette of claim 5, wherein said inner panel has substantially a "T" shape with an upper portion for covering a top of said cassette and a lower portion facing a nonmagnetic side of said tape.

8. A magnetic tape cassette of claim 7, wherein said lower portion of said inner panel has an engaging lug vertically disposed substantially in the middle of said lower portion and said outer panel has a lug provided on an inside surface of said outer panel, said engaging lug of said inner panel and said lug of said outer panel being pivotably coupled to one another.

9. A magnetic tape cassette of claim 8, wherein said lower portion of said inner panel further comprises sliding protrusions located at both ends of the bottom of said inner panel, and
wherein said inner walls of said cassette comprise sliding grooves, said sliding protrusions being slidably received in said sliding grooves.

* * * * *